(12) United States Patent
Piotrowski

(10) Patent No.: US 6,601,762 B2
(45) Date of Patent: Aug. 5, 2003

(54) POINT-OF-SALE (POS) VOICE AUTHENTICATION TRANSACTION SYSTEM

(75) Inventor: Tony E. Piotrowski, Wayne, NJ (US)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/882,079

(22) Filed: Jun. 15, 2001

(65) Prior Publication Data
US 2002/0190124 A1 Dec. 19, 2002

(51) Int. Cl.$^7$ ................................................ G06K 5/00
(52) U.S. Cl. ...................... 235/382; 235/379; 235/380; 235/383
(58) Field of Search .................. 235/375, 380, 235/382, 379, 383; 705/43; 704/273

(56) References Cited

U.S. PATENT DOCUMENTS

| | | | | |
|---|---|---|---|---|
| 5,371,797 A | * | 12/1994 | Bocinsky, Jr. ............... | 705/70 |
| 5,513,272 A | * | 4/1996 | Bogosian, Jr. .................. | 710/1 |
| 5,825,871 A | * | 10/1998 | Mark ........................... | 379/355 |
| 5,915,001 A | * | 6/1999 | Uppaluru .................. | 379/88.22 |
| 5,987,155 A | * | 11/1999 | Dunn et al. .................. | 382/116 |
| 6,016,476 A | * | 1/2000 | Maes et al. ..................... | 705/1 |
| 6,085,177 A | * | 7/2000 | Semple et al. .............. | 235/379 |
| 6,098,879 A | * | 8/2000 | Terranova .................... | 235/384 |
| 6,119,933 A | * | 9/2000 | Wong et al. ................. | 235/380 |
| 6,185,535 B1 | * | 2/2001 | Hedin et al. ................. | 704/270 |
| 6,213,391 B1 | * | 4/2001 | Lewis .......................... | 235/380 |
| 6,266,640 B1 | * | 7/2001 | Fromm ......................... | 704/273 |
| 6,269,336 B1 | * | 7/2001 | Ladd et al. .................. | 704/270 |
| 6,308,887 B1 | * | 10/2001 | Korman et al. ............. | 235/379 |
| 6,488,203 B1 | * | 12/2002 | Stoutenburg et al. ....... | 235/379 |

* cited by examiner

Primary Examiner—Michael G. Lee
Assistant Examiner—Ahshik Kim

(57) ABSTRACT

A system and method for providing voice authentication during a sale transaction through a telephone system or other communication means, wherein users to the service may require voice authentication as a prerequisite to conduct a conventional credit card or debit transaction. The voice authentication step is performed based on a comparison between a previously recorded voice message and the voice message inserted through the system using the voice browser and the voice recognition technology.

12 Claims, 4 Drawing Sheets

POINT-OF-SALE (POS) VOICE AUTHENTICATION TRANSACTION SYSTEM

BACKGROUND OF THE INVENTION

1. Field of Invention

The present invention relates to a method and system for verifying a credit/debit card transaction. In particular, the present invention relates to the use of a voice identification mechanism to analyze a consumer's information to verify user identity.

2. Description of the Invention

Most retail stores, restaurants, and other businesses providing credit card transactions for effectuating a sale need to have an accurate process of customer identification to avoid fraudulent transactions. In a typical credit or debit card, the consumer presents the card to the cashier during a check out or at the point of sale when the purchases are made. The cashier then checks the signature or picture located in the back of the credit card to verify the user's identity. If a debit card is used, the consumer is requested to punch in his or her own secret pin number to receive approval from the card issuing company. Despite all these precautionary attempts to prevent illegal transactions, credit card frauds are rampant in many business establishments. What is needed, therefore, is a system for more effectively verifying the identification of credit card users at a lower cost, so that participating merchants and consumers can experience enhanced security.

SUMMARY OF THE INVENTION

The present invention is directed to an authentication system located at the point of sale to allow a voice verification process for authenticating the user's identity.

According to an aspect of the invention, there is provided a voice authentication system for authorizing a user to obtain access to one or more services provided by a remote service provider system. The system includes an input means for prompting the user to speak a plurality of words; a processor operative under the control of a program stored therein and responsive to the receipt of the spoken words from the user and the transmission of the spoken words to the service provider system; a voice browser controlled by the processor for establishing a communication channel to transmit the spoken words by the user to the service provider system; and, a voice recognition means controlled by the processor for recognizing the spoken words by the user, wherein the service provider system determines that the user is an authorized user if the spoken words by the user match a pre-recorded voice reference data stored in the service providing system.

According to another aspect of the invention, there is provided a method of providing a voice authentication process, the method including the steps of: storing a number of voice inputs to generate a voice reference data in a database of a remote service provider system; initiating a call connection to obtain access to one or more services to the remote service provider system; prompting the user by the service provider system to speak at least one word corresponding to the voice inputs used to create the voice reference data; comparing the spoken word by the user to said voice inputs stored in the voice reference data to establish a match; if a match is not established, prompting the user to speak again; and, if a match is established, enabling the user to access said one or more services provided by the service provider system.

One embodiment of the invention is directed to a system for authorizing a user to perform a commercial transaction provided by a service provider system. The system includes an input means for prompting said user to speak one or more words, a processor and a voice browser that can establish a communication channel to transmit words to a remote system. The system also includes a voice recognition means at the remote system. The service provider system determines that the user is authorized to perform the commercial transaction based upon an indication, received by the voice browser, as to whether the words voice match predetermined voice reference data.

Another embodiment of the invention is directed to a point of sale terminal. The terminal includes a voice input device for inputting voice data of a user and an input device for inputting information related to a credit or debit card transaction requested by the user. The terminal also includes means for verifying that the user is an authorized user of the credit or debit card.

These and other advantages will become apparent to those skilled in this art upon reading the following detailed description in conjunction with the accompanying drawings.

DETAILED DESCRIPTION OF THE PREFERRED EMBODIMENT

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments, which depart from these specific details. Moreover, for purposes of simplicity and clarity, detailed descriptions of well-known devices, circuits, and methods are omitted so as not to obscure the description of the present invention with unnecessary detail.

A typical credit or debit card transaction is initiated by sliding the card through a terminal device to obtain a purchase approval from the credit card issuer. The terminal sometimes requests the consumer or retail clerk to input additional data about the consumer for identification purposes. The present invention is applicable in this type of transaction by allowing merchants or consumers to verify the credit or debit card transaction using a voice authentication system at the point of sale (POS).

In particular, the present invention utilizes a speech recognition system to enhance the security of the use of a transaction card through a telephone system or other related duplex communication systems (i.e., POS terminal). To achieve this, the POS terminal 10 includes a Voice XML interface, which facilitates the exchange of voice print data. It is noted, however, that other types of voice communication interfaces can also be used.

The VoiceXML is a Web-based markup language for representing human-computer dialogs, just like HTML. However, unlike the HTML, which provides a graphical web browser with display, keyboard, and mouse, the Voice XML is a voice browser with audio output (computer-synthesized and/or recorded), and audio input (voice and/or keypad tones), thus simplifying voice application. Typically, the VoiceXML voice browser runs on a specialized voice gateway node that is connected both to the public switched telephone network and the Internet. Communicating voice print data is well known in the art that can be performed in a variety of ways. See for example, The VoiceXML Forum, IEEE Industry Standards, and Technology Organization (IEEE-ISTO), the contents of which are hereby incorporated by reference.

Figure 1:
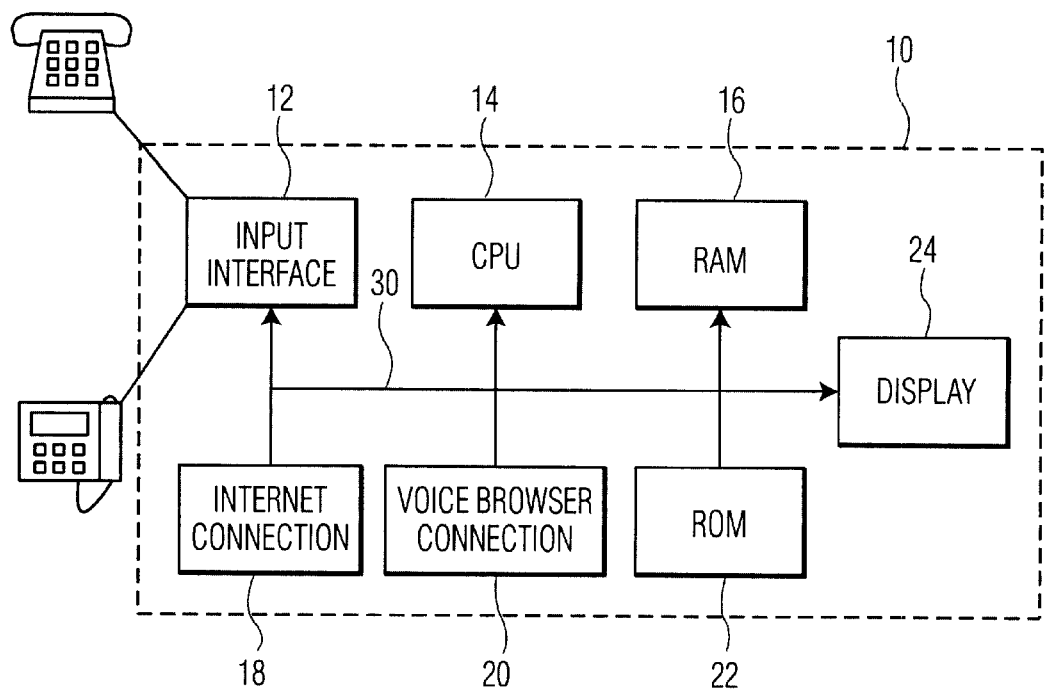
FIG. 1 is a representation of the voice authentication device in accordance with the present invention.

Referring now to FIG. 1, a point-of-sale (POS) terminal 10 on which the voice authentication process of the present invention may be implemented is shown. The exemplary POS terminal 10 of FIG. 1 is for descriptive purposes only. Although the description may refer to terms commonly used in describing particular computer systems, the description and concepts equally apply to other processing systems, including systems having architectures dissimilar to that shown in FIG. 1.

Major components of the POS terminal 10 that enable a voice authentication process between the credit card holder and the credit card issuer include an input interface 12 for receiving a request for credit card transaction, such as reading a bar code of the credit card, and for initiating the voice authentication process; a central processing unit (CPU) 12, which may be provided, for example, as a conventional microprocessor; a random access memory (RAM) 16 for temporary storage of information; an Internet connection circuit 18 for communicating over the web; a voice browser 20 for providing audio input and output; a read only memory (ROM) 22 for permanent storage of information; and, a display circuit 24. Each of the aforementioned components is coupled to a bus 30.

Operation of the POS terminal 10 is generally controlled and coordinated by an operating system software, which controls the allocation of system resources and performs tasks such as processing, scheduling, memory management, networking, and I/O services, among other things. Thus, the operating system resident in the memory 22, and executed by CPU 14, coordinates the operation of the other elements of the POS terminal 10. It should be noted that the inventive POS terminal 10 within the context of this disclosure includes a lap-top computer, a mobile phone, and other mobile computer devices, such as a personal digital assistant (PDA), a personal communication assistant (PCA), an electronic organizer, an interactive TV/set-top box remote control, or any duplex interactive devices with the capabilities to enable credit card transactions.

Figure 2:
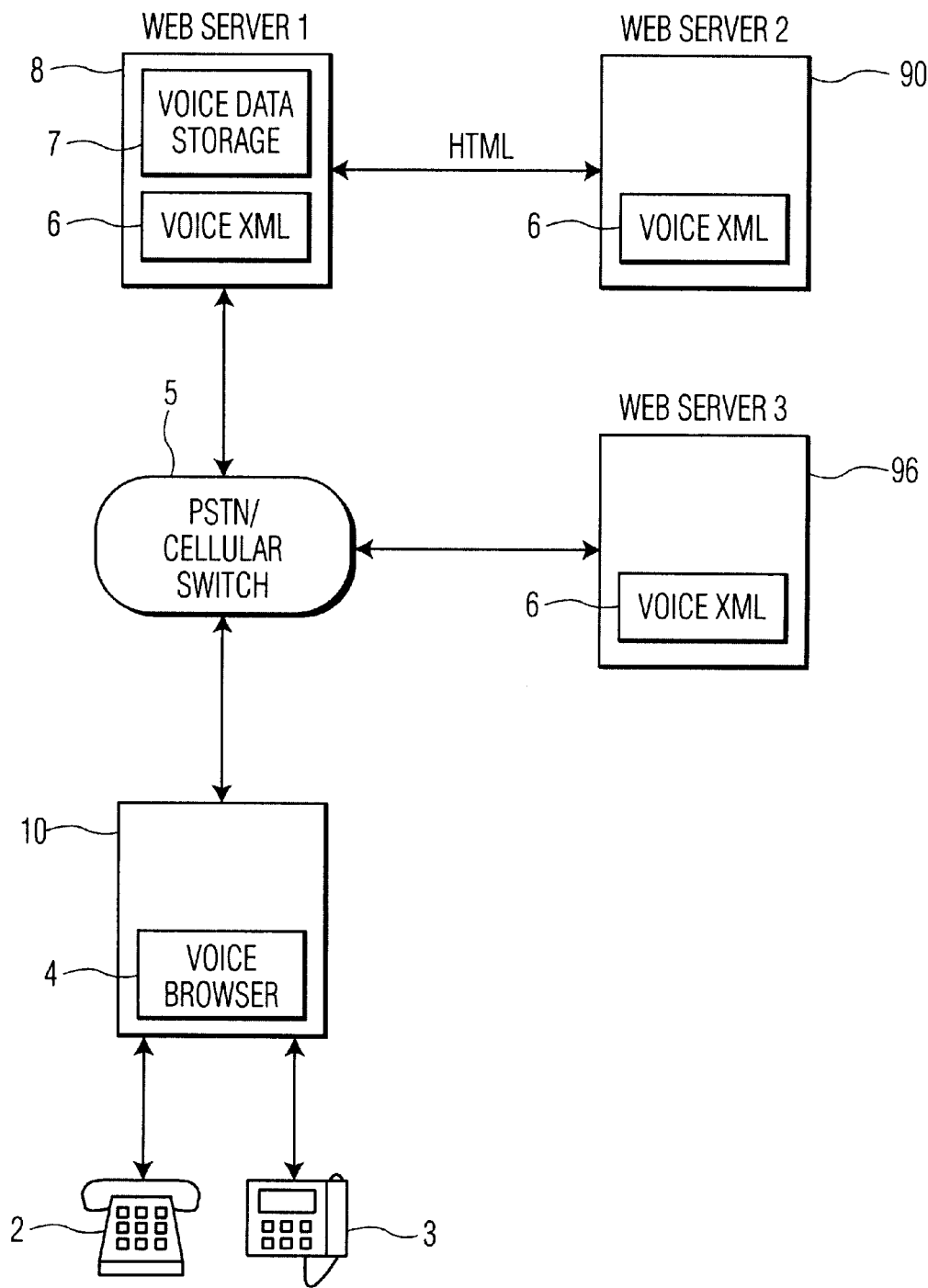
FIG. 2 is a simplified block diagram of the voice authentication system that may be located at a point of sale and its associated network in accordance with the present invention.

FIG. 2 is a diagrammatic illustration of a preferred embodiment of a voice authentication network according to the present invention. The POS terminal 10 shown in FIG. 1 is located at the point of sale, i.e, a retail store or other business establishments. When the consumer approaches the check-out counter, the retail clerk at the counter uses the POS terminal 10 or a card reader 3 coupled to the POS terminal 10 to charge the cost of a particular product to the consumer's credit card account. The bar code is read by the input interface 12 or through a bar code reading terminal 3 that is coupled to the input interface 12. It will be appreciated by one of ordinary skill in the art that other types of data reading interfaces may also be used. For example, radio frequency identification (RFID) technology, may be used. RFID systems allow for non-contact reading in manufacturing and other types of environments where barcode labels may not perform properly or be practical.

The identification information retrieved from the bar code and the purchase information are transmitted to the credit card issuing company's server 8 via the web browser 20 for verifying the consumer's identity and for receiving the purchase approval. To achieve this, the POS terminal 10 communicates with, e.g., dials the phone numbers of, other web servers 8 and 9 belonging to the credit card issuers and transmits the identification and purchase data to the respective web server. When the identification and purchase information are received by the web server 8, the remote database 7 is accessed to verify the consumer's credit and the identification of the consumer. The remote web server system 8 is accessed by the POS terminal 10 through a wide area network, such as the public telephone network/cellular switch network 5, or an Internet router that routes TCP/IP datagrams.

The remote web server 8 may also have access to another secondary web server 9a, or other secondary web server 9b to execute the same or different verification process. For example, other entities may also create voice databases, i.e., the department of motor vehicles, telephone companies, wireless providers, etc., in the secondary web server 9b to be accessed for different verification purposes. These databases may be accessed based upon the customer's driver's license, home telephone number, or other personal information. Also any number of commercially or publicly available voice browsers can be utilized in various implementations in accordance with the preferred embodiment of the present invention.

It should be noted that other embodiments of the present invention are also operable of providing voice authentication for credit card transactions via telephone 2 or over the web using a conventional computer system. The system can also operate to provide voice authentication for personal check transactions. In the web situation, a voice input device, e.g., a microphone, is needed to input voice data into the computer system. Hence, many other configurations are possible, as would be apparent to one skilled in the art, and the present invention is not meant to be limited to any particular type of network.

Figure 3:
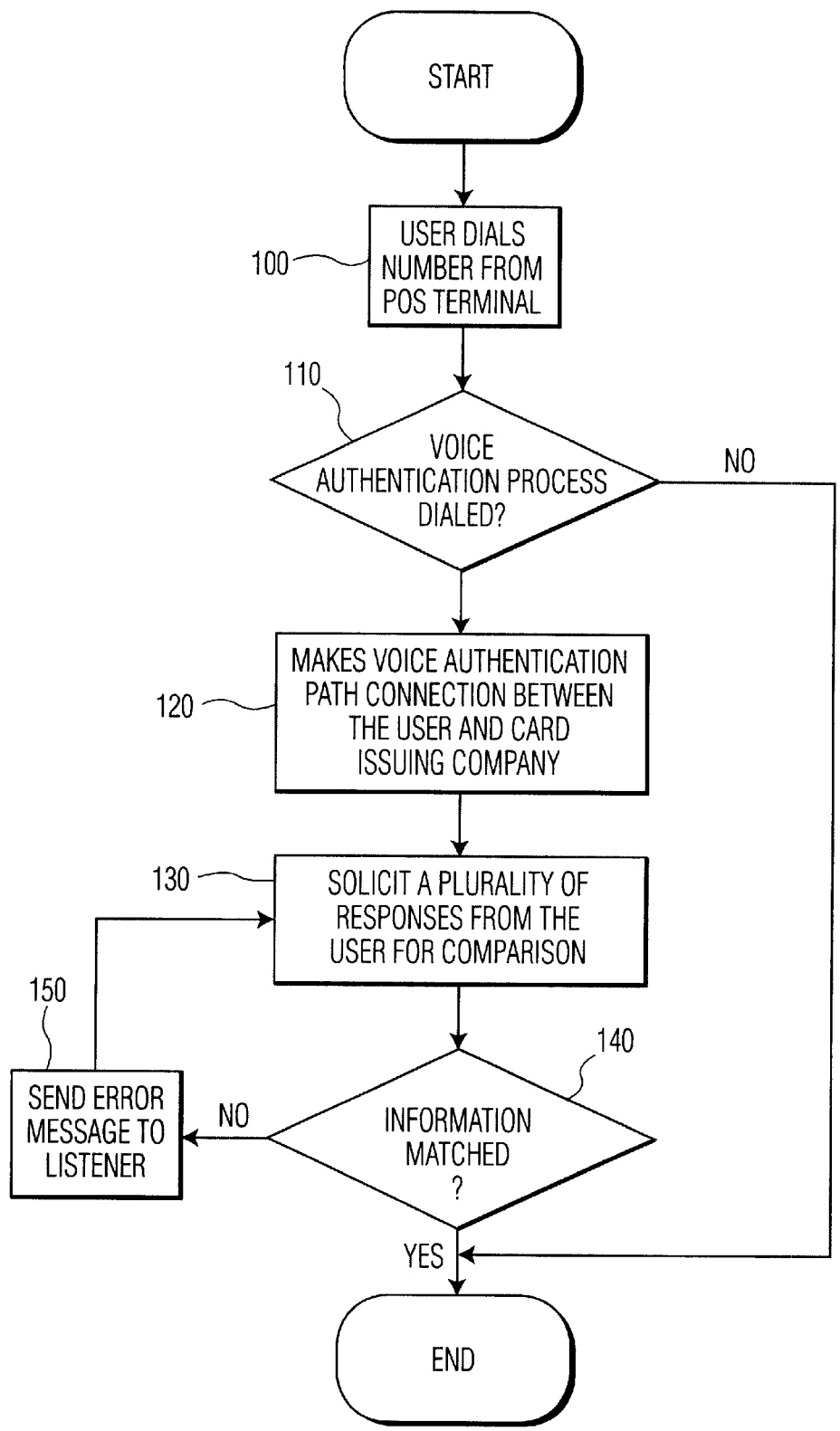
FIG. 3 is a flow chart of the operation of the voice authentication process in accordance with the present invention; and, FIG. 4 illustrates a different type of data that can be used to verify the credit card user's identity in accordance with the present invention.

FIG. 3 is a flow diagram illustrating the operation steps performed by the present invention to provide a voice authentication process. As shown in FIG. 3, one embodiment of the present invention is directed to a computer program product comprising a computer readable medium having control logic (computer software) stored therein. The control logic, when executed, e.g., by the processor 14, causes various functions to be performed as described herein. The rectangular elements indicate computer software instruction, where as the diamond-shaped element represents computer software instructions that affect the execution of the computer software instructions represented by the rectangular blocks. It will be appreciated by those of ordinary skill in the art that unless otherwise indicated herein, the particular sequence of steps described is illustrative only and can be varied without departing from the spirit of the invention.

The voice verification processing aspects of the present invention may be initiated when the POS terminal 10 reads the encoded data from the credit card as the card is swiped to the POS terminal 10. If the magnetic strip or bar code is damaged or unreadable, the user or the retail clerk can manually input the desired information from the card. In step

100, the POS terminal 10 establishes a communication channel to the remote web server 8. This communication channel may be a dial or dedicated connection. Then, it is determined whether a request for voice authentication is requested in step 110. The request for voice authentication may be made in real time or a predetermined periodic schedule. If the voice authentication process is requested by the calling party in step 110, a path connection between the POS terminal 10 and the web server 8 of the credit card company is established in step 120.

Thereafter, the remote server 8 processes the identification data retrieved from the bar code and requests the user to speak one or more voice responses to verify the user's identity. The voice input (i.e., voice print of the customer) is received through the user interface 12, i.e., microphone, of the POS terminal 10. The voice browser 20 transforms the voice input into the corresponding voice print format and forwards it to the remote web server 8 in the form of VoiceXML responses. Upon receiving spoken words, the remote server 8 searches its own database to establish a match with a pre-recorded verification reference data of the consumer in step 130. The voice input may also be provided via a telephone input system 2, a personal digital assistant (PDA), a personal computer (PC) or other mobile voice communication device as discussed above.

Figure 4:
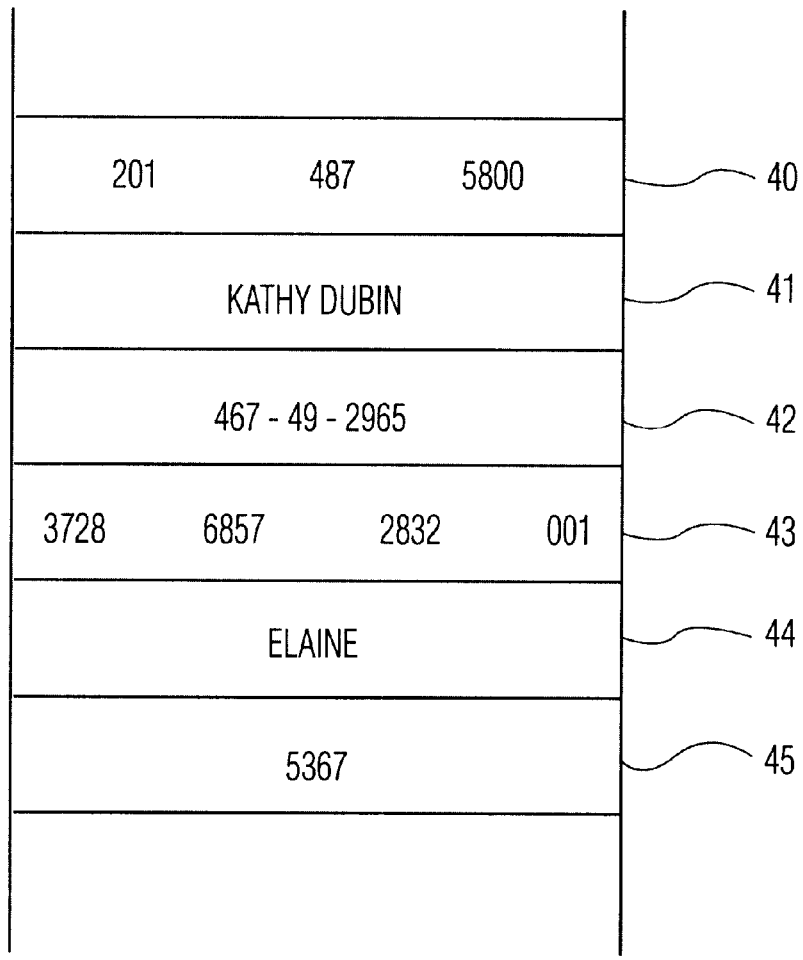

The database 7 may be formed by credit card companies as part of a customer's card initialization process. For example, a customer may be required to call a specified number and speak various combinations of words or numbers which then will be stored as a voice verification reference data in the database 7. As shown in FIG. 4, the various combination of words or numbers may include, a telephone number 40, a name 41, a social security number 42, a credit card number 43, a nick name 44 or a pin number 45. The verification reference data are typical pieces of information used in verifying a user's identity. This information is also typical information needed to perform a credit card transaction over the telephone or via the Internet.

The database 7 may also contain information for secondary users of a given credit card to be added as needed. Similarly, the secondary users would set-up a voice print with the credit card company during the initialization process.

Finally, a comparison process is performed to determine whether the voice input from the POS terminal 10 voice matches the pre-recorded voice reference data of the requesting party in step 140. The voice match indicates that the voice signature of the stored voice reference data matches the voice signature of the input voice data. For background information on voice authentication see U.S. Pat. Nos. 5,499,288, 5,127,043 and 5,297,194, incorporated by reference herein. The voice authentication step could be conducted immediately or at some later time in the case of a telephone or Internet transaction. If a match is not established, the customer could be notified in step 150 or be prompted to speak the word/number again. One or more failed voice authentication attempts may also trigger inactivation of the card. If a match is established, the user's identity is accepted, and the credit card holder is now allowed to complete the purchase.

Having thus described a preferred embodiment of the present invention for a voice authentication process, it should be apparent to those skilled in the art that certain advantages of the system have been achieved. The foregoing is to be constructed as only being an illustrative embodiment of this invention. Persons skilled in the art can easily conceive of alternative arrangements providing a functionality similar to this embodiment without any deviation from the fundamental principles or the scope of this invention. Moreover, the present invention is operable to provide voice authentication for check transactions and other operations requiring user identification.

What is claimed is:

1. A method for verifying a user's identity using a voice input, the method comprising the steps of:

(a) initiating a commercial transaction using a point-of-sale terminal operated by a commercial establishment;

(b) prompting said user to speak, via the point-of-sale terminal, at least one word corresponding to predetermined voice reference data;

(c) comparing the at least one word to said voice reference data to establish a voice match; and (d) if a match is established, enabling the commercial establishment to complete the commercial transaction, wherein said database is remotely accessed using a voice web-based markup (VoiceXML) language protocol.

2. The method of claim 1, wherein, if a match is not established, canceling the commercial transaction.

3. The method of claim 1, wherein said voice reference data includes personal information of said user.

4. The method of claim 1, wherein said voice reference data is stored in a database associated with a plurality of users.

5. The method of claim 1, wherein the commercial transaction is a credit or debit card transaction.

6. A method for verifying a user's identity in order to complete a commercial transaction using a point-of-sale terminal operated by a commercial establishment, the method comprising the steps of:

(a) prompting said user, via the point-of-sale terminal, to speak voice reference information;

(b) recognizing and storing each of said spoken voice reference information in a storage means for subsequent retrieval;

(c) allowing for the establishment of a remote connection to the storage means upon receiving a request to verify the user's identity in connection with the commercial transaction;

(d) receiving a voice utterance of one or more words corresponding to at least one word that is used to create said voice reference information;

(e) comparing said transmitted voice utterance with said stored voice reference data to establish a voice match; and, (f) providing an indication to the commercial establishment as to whether the voice match is located or not, wherein the remote connection is achieved using a voice web-based markup (VoiceXML) language protocol.

7. The method of claim 6, further comprising the step of repeating said steps (d)–(f) if a match is not established.

8. The method of claim 6, wherein said request to verify the user's identity is performed according to a predetermined schedule.

9. The method of claim 6, wherein the commercial transaction includes a credit or debit card transaction at a point of sale terminal.

10. The method of claim 6, wherein said request to verify the user's identity is performed in real time.

11. The method of claim 6, further comprising the step of enabling said user to access one or more services from said service provider system if a match is established.

12. A point of sale terminal comprising:
- a voice input device for inputting voice data of a user;
- an input device for inputting information related to a credit or debit card transaction requested by the user.
- means for requesting verification that the user is an authorized user of the credit or debit card,
- wherein the verification is a voice authentication process performed using the voice data input by the user, and the verification of the user's identity can be performed on a periodic basis or in real time,
- wherein the means for verifying includes a voice browser that uses a voice web-based markup (VoiceXML) language protocol.

* * * * *